United States Patent
Inoko et al.

(10) Patent No.: US 7,062,422 B2
(45) Date of Patent: Jun. 13, 2006

(54) PLC SYSTEM CONSTRUCTION SUPPORT TOOL AND PLC SYSTEM PROGRAM DEVELOPMENT SUPPORT TOOL INCLUDING THE SAME

(75) Inventors: Akihiro Inoko, Osaka (JP); Katsunari Koyama, Osaka (JP)

(73) Assignee: Keyence Corporation, Osaka (JP)

( * ) Notice: Subject to any disclaimer, the term of this patent is extended or adjusted under 35 U.S.C. 154(b) by 752 days.

(21) Appl. No.: 09/901,188

(22) Filed: Jul. 9, 2001

(65) Prior Publication Data

US 2002/0040286 A1    Apr. 4, 2002

(30) Foreign Application Priority Data

Oct. 2, 2000 (JP) .................. P. 2000-339716

(51) Int. Cl.
*G06F 17/50* (2006.01)

(52) U.S. Cl. .................. 703/13; 717/135; 710/29; 710/315; 700/2

(58) Field of Classification Search .................. 703/7, 703/21, 14, 13; 700/2; 710/29, 315; 715/704; 717/135; 137/2
See application file for complete search history.

(56) References Cited

U.S. PATENT DOCUMENTS

| | | | | |
|---|---|---|---|---|
| 6,184,880 B1 * | 2/2001 | Okada | .................. | 715/704 |
| 6,381,501 B1 * | 4/2002 | Takase | .................. | 700/2 |
| 6,401,159 B1 * | 6/2002 | Wang | .................. | 710/315 |
| 6,405,745 B1 * | 6/2002 | Kar et al. | .................. | 137/2 |
| 6,618,856 B1 * | 9/2003 | Coburn et al. | .................. | 717/135 |
| 6,640,264 B1 * | 10/2003 | Moore | .................. | 710/29 |

FOREIGN PATENT DOCUMENTS

| | | |
|---|---|---|
| JP | 8-249022 | 9/1996 |
| JP | 9-6418 | 1/1997 |

* cited by examiner

*Primary Examiner*—Paul L. Rodriguez
*Assistant Examiner*—Kandasamy Thangavelu
(74) *Attorney, Agent, or Firm*—Kilyk & Bowersox, P.L.L.C.

(57) ABSTRACT

A PLC system construction support tool is provided wherein a display 31 of text and numeric values is produced at the left of a paste board 22. The display 31 is provided for each row of a system and whenever a unit is added or deleted, the numeric values are updated. The display 31 contains a character string of "WIDTH" meaning the total length of the units on the corresponding row and the numeric value of the width (mm units), a character string of "CURRENT CONSUMPTION" meaning the total current consumption of the units on the corresponding row and the numeric value of the current consumption (mA units), and a character string of "WEIGHT" meaning the total weight of the units on the corresponding row and the numeric value of the weight (g units).

17 Claims, 12 Drawing Sheets

UNIT TYPE DATA FILE

| 16-POINT INPUT UNIT | 32-POINT OUTPUT UNIT | POSITIONING UNIT |
|---|---|---|
| WIDTH OF UNIT | WIDTH OF UNIT | WIDTH OF UNIT |
| WEIGHT | WEIGHT | WEIGHT |
| CURRENT CONSUMPTION | CURRENT CONSUMPTION | CURRENT CONSUMPTION |
| CORRESPONDING BIT MAP ADDRESS | CORRESPONDING BIT MAP ADDRESS | CORRESPONDING BIT MAP ADDRESS |

FIG.13

| INDIVIDUAL DATA FILE |
|---|
| IDENTIFICATION NUMBER |
| UNIT TYPE |
| ASSIGNED RELAYS |
| OPERATION CONDITION PARAMETER |

FIG.14

BIT MAP DATA FILE

| 16-POINT INPUT UNIT | 32-POINT OUTPUT UNIT | POSITIONING UNIT |
|---|---|---|

PLC SYSTEM CONSTRUCTION SUPPORT TOOL AND PLC SYSTEM PROGRAM DEVELOPMENT SUPPORT TOOL INCLUDING THE SAME

BACKGROUND OF THE INVENTION

1. Field of the Invention

This invention relates to the design of a programmable logic controller system (which will hereinafter be referred to as a "PLC system") and more particularly to a PLC system construction support tool for easily selecting the units making up a PLC system and examining the whole rational layout of the PLC system before the PLC system is actually constructed, and a PLC system program development support tool in which the PLC system construction support tool is included.

2. Description of the Related Art

As seen in Japanese Patent Unexamined Publication No. Hei. 8-249022, a PLC system reads an instruction command or word from a user program and performs operations on the data read from the data memory based on the address following an operand of the instruction word.

Thus, in a program development support tool, symbols described on a ladder diagram need to be converted into instruction words and operands responsive to each PLC system need to be defined using a program creation tool for creating a ladder program of the PLC system.

After such a program creation tool is used to create a program of the PLC system, how the PLC system is actually constructed introduces another problem. That is, before the PLC system is actually constructed, any desired units are selected from among available various units and it is necessary to sufficiently examine how the selected units are rationally laid out in combination, and how the relay relation is rationally set, and so forth on.

SUMMARY OF THE INVENTION

It is therefore a first object of the invention to provide a PLC system construction support tool for conveniently selecting the units making up a PLC system and examining a rational combination of the units, before the PLC system is actually constructed.

It is a second object of the invention to provide a PLC system construction support tool for enabling selection work of specific units making up a PLC system to be taken from the operator.

It is a third object of the invention to provide a PLC system construction support tool for enabling determination work of the whole combined layout of the units making up a PLC system to be taken from the operator before the PLC system is actually constructed.

It is a fourth object of the invention to provide a PLC system construction support tool for enabling work for setting and changing various setup values of the units making up a PLC system to be taken from the operator when the PLC system is actually constructed.

It is a fifth object of the invention to provide a PLC system program development support tool for creating a PLC system program comprising instruction words into which a created ladder program is converted, and further enabling improvement in the workability of a work sequence for selecting the units making up a PLC system, and examining the whole rational layout of the units before the PLC system is actually constructed.

To these ends, according to a first aspect of the invention, there is provided a PLC system construction support tool for simulating selection of component units and a combination thereof on a screen before a PLC system is actually constructed, the PLC system construction support tool comprising:

a first screen for displaying a list of various units that can be selected for constructing the PLC system; and a second screen placed adjacent to the first screen for displaying the units selected out of the first screen in the same configuration as the units are actually placed. In the PLC system construction support tool, the total values of current consumption and/or voltage consumption of the units are displayed on the second screen in numerical form in an area adjacent to a row of the units on the second screen.

In addition to current consumption and/or voltage consumption, the total value of the width of the units making up a row of the units may be displayed in numeric form in an area adjacent to the row of the units on the second screen. In addition to the current consumption and/or voltage consumption and the total width of the units, the total value of the weights of the units making up a row of the units may also be displayed. When the units selected out of the first screen are displayed on a plurality of rows on the second screen, the total values of current consumption and/or voltage consumption, the width, or the weights of the units on each row may be displayed on the second screen in numerical form in an area adjacent to the corresponding row of the units.

To these ends, according to a second aspect of the invention, there is provided a PLC system construction support tool for simulating selection of component units and a combination thereof on a screen before a PLC system is actually constructed, the PLC system construction support tool comprising:

a first screen for displaying a list of various units that can be selected for constructing the PLC system;

a second screen being placed adjacent to the first screen for displaying the units selected out of the first screen in the same state as the units are actually placed; and a display mode switch unit for switching the second screen between a first display mode for displaying schematic front patterns of the units resulting from scaling down the actual units at a predetermined ratio, and a second display mode for displaying the units as box patterns.

In the PLC system construction support tool, in the second display mode, the assigned relay number of each unit is displayed in numeric form in association with the box pattern of the corresponding unit.

As for the assigned relay number of each unit displayed in association with the box pattern of the corresponding unit, it is preferred to provide a screen for entering the assigned relay number, for example, and call the screen for the operator to enter or change the assigned relay number.

To these ends, according to a third aspect of the invention, there is provided a PLC system construction support tool for simulating selection of component units and a combination thereof on a screen before a PLC system is actually constructed, the PLC system construction support tool comprises:

- a first screen for displaying a list of various units that can be selected for constructing the PLC system;
- a second screen placed adjacent to the first screen for displaying the units selected out of the first screen in the same configuration as the units are actually placed;
- a determination unit for determining whether or not a specific unit is selected from among the various units displayed on the first screen; and
- a forcible placement unit for placing the specific unit at a predetermined position on the second screen when the specific unit is selected.

Here, the specific unit typically is a CPU unit or a power supply unit.

To these ends, according to a fourth aspect of the invention, there is provided a PLC system program development support tool comprising:

- a PLC program creation tool for creating a ladder program and creating a program converted into instruction commands to operate a PLC system in accordance with the created ladder program; and
- a PLC system construction support tool built into the PLC program creation tool, for simulating selection of component units and a combination thereof on a screen before a PLC system is actually constructed, wherein a selective switch can be made between the PLC program creation tool and the PLC system construction support tool.

In the PLC system program development support tool, the PLC system construction support tool comprises:

- a first screen for displaying a list of various units that can be selected for constructing the PLC system; and
- a second screen placed adjacent to the first screen for displaying the units selected out of the first screen in the same configuration as the units are actually placed, wherein total values of current consumption and/or voltage consumption of the units are displayed on the second screen in numerical form in an area adjacent to a row of the units on the second screen.

These and other objects and advantages of the invention will become apparent from the following detailed description of the embodiment of the invention.

DETAILED DESCRIPTION OF THE PREFERRED EMBODIMENT

Referring now to the accompanying drawings, there is shown a preferred embodiment of the invention.

Figure 1:
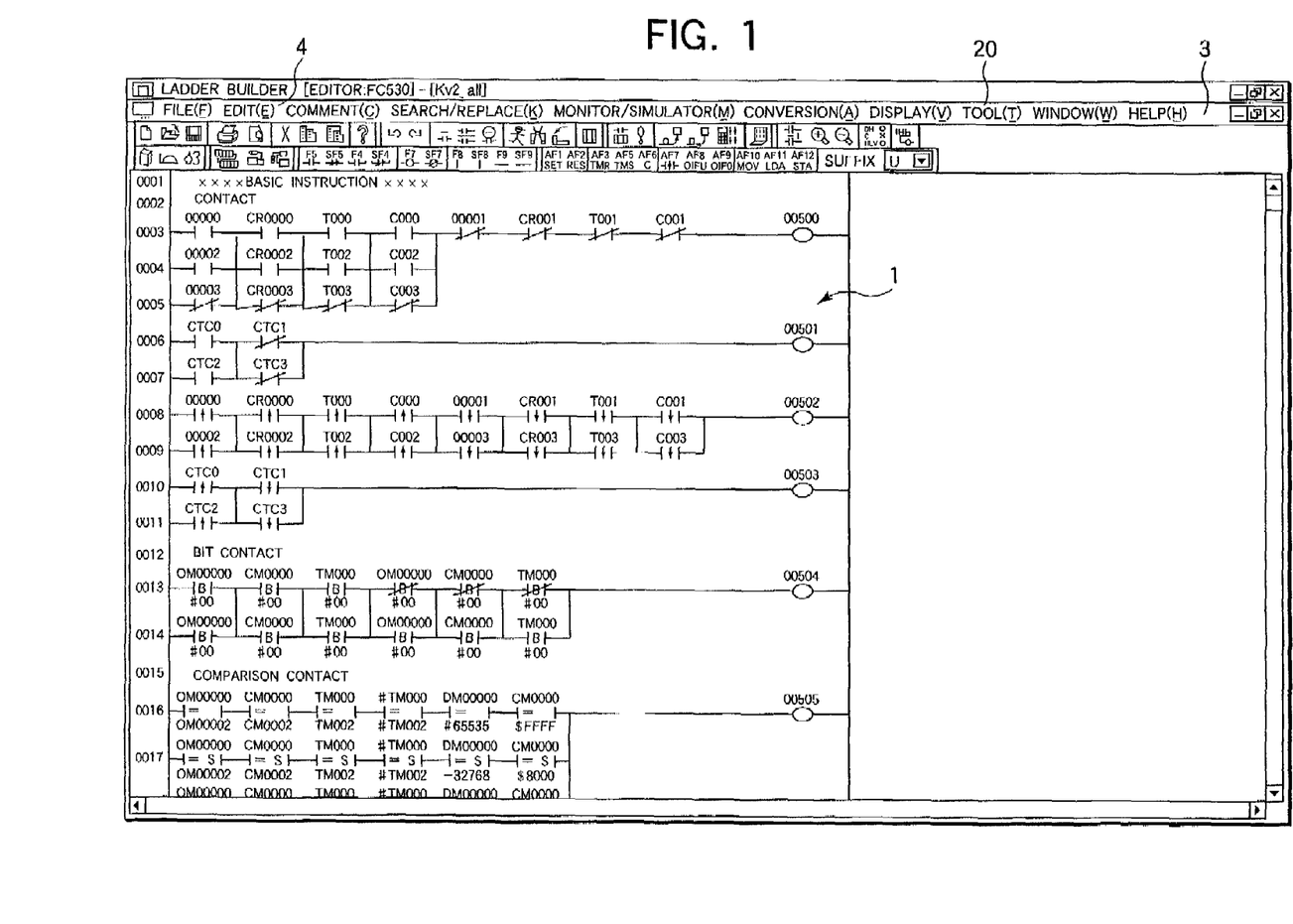
FIG. 1 is a drawing showing a part of a screen displaying a created ladder diagram.
Figure 2:
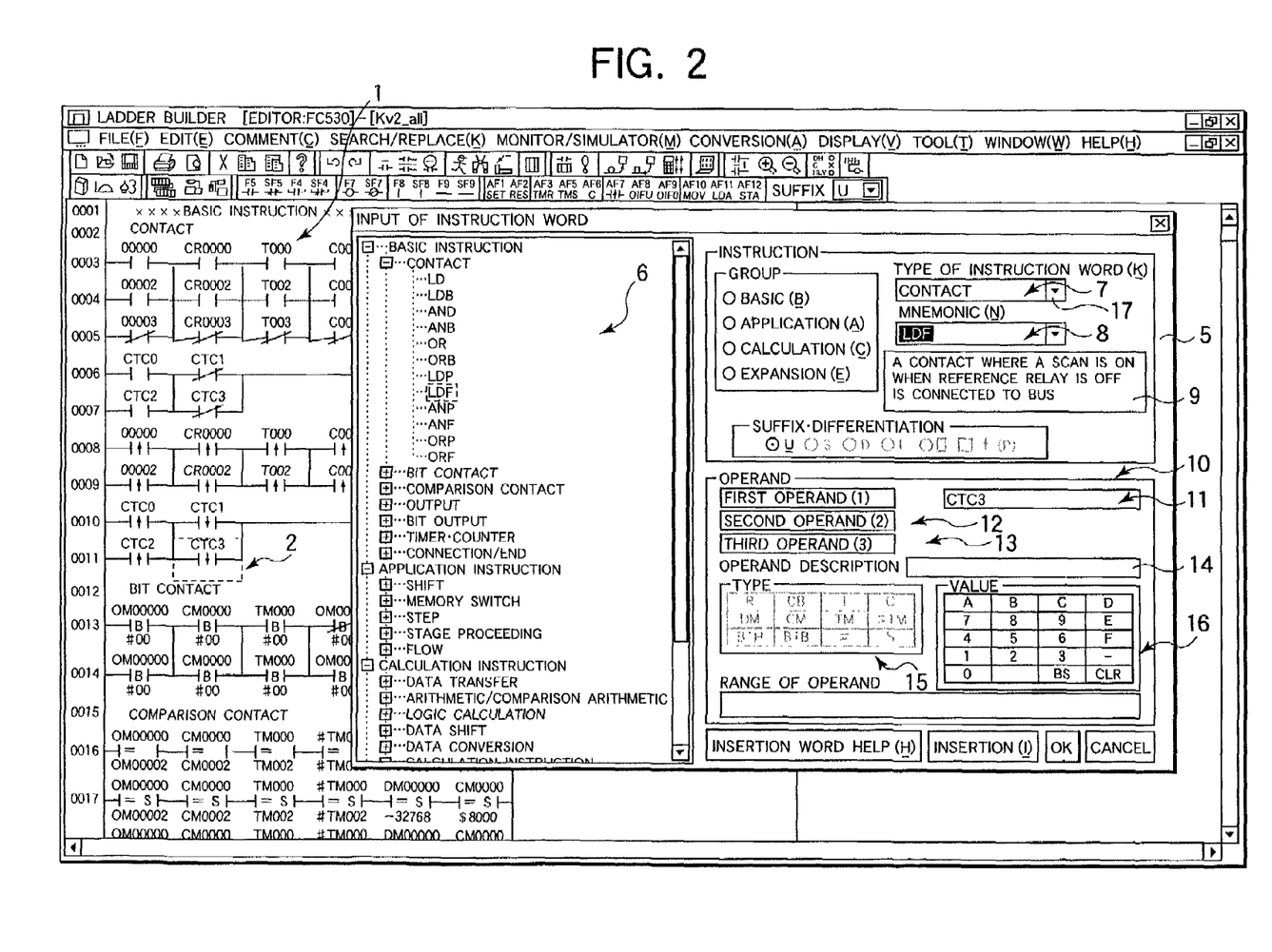
FIG. 2 is a drawing showing a state in which a dialog box of "INPUT OF INSTRUCTION WORD" is superposed on a ladder diagram display screen.

FIG. 1 shows a part of a screen of editor software that can be used to create a ladder program and a PLC system program, on sale under the name of "Ladder Builder" and shows a ladder diagram created using the software. When the operator clicks on an arbitrary ladder symbol contained in a ladder diagram 1, namely, a circuit, for example, the symbol indicated by numeral 2 (as shown in FIG. 2), for selection and then selects an instruction word input command (not shown) out of an edit menu 4 existing on a menu bar 3, a dialog box 5 of "INPUT OF INSTRUCTION WORD" is superposed on the screen displaying the ladder diagram 1, as shown in FIG. 2. The "INPUT OF INSTRUCTION WORD" dialog box 5 can also be superposed on the display by double-clicking on the symbol 2 contained in the ladder diagram 1.

The "INPUT OF INSTRUCTION WORD" dialog box 5 has a window 6 for listing instruction words in text in the left portion. In the right portion of the dialog box 5, it also has an instruction word type display field 7 for displaying the type of instruction word, a mnemonic display field 8 below the instruction word type display field 7, a comment display area 9 below the mnemonic display field 8, and an operand display area 10. The operand display area 10 comprises first to third operand input fields 11 to 13, an operand description display field 14, a plurality of buttons 15, and a plurality of buttons 16. The buttons 15 make up an operand type input support means for facilitating the entry of the operand type, and the buttons 16 make up an operand value input support means for facilitating the entry of the operand value, and the like.

At the same time as the "INPUT OF INSTRUCTION WORD" dialog box 5 is displayed, the instruction word, etc., corresponding to the selected ladder symbol 2, is read from various data files (not shown) down loaded into the memory of a computer (not shown) together with a program development support tool. The instruction word type corresponding to the selected symbol 2, for example, a character string of "CONTACT," is displayed in the instruction word type display field 7, a mnemonic of "LDF" corresponding to the selected symbol 2 is displayed in the mnemonic display field 8, and an operand of "CTC3" is displayed in the first operand input field 11.

If the operator wants to change an automatically set instruction word, he or she may click on an arrow button 17 placed at the right end of the instruction word type display field 7 for displaying a list, and may click on the character string of any desired instruction word type out of the list for selection, or may select the instruction word out of the instruction word list displayed in the window 6.

Figure 3:
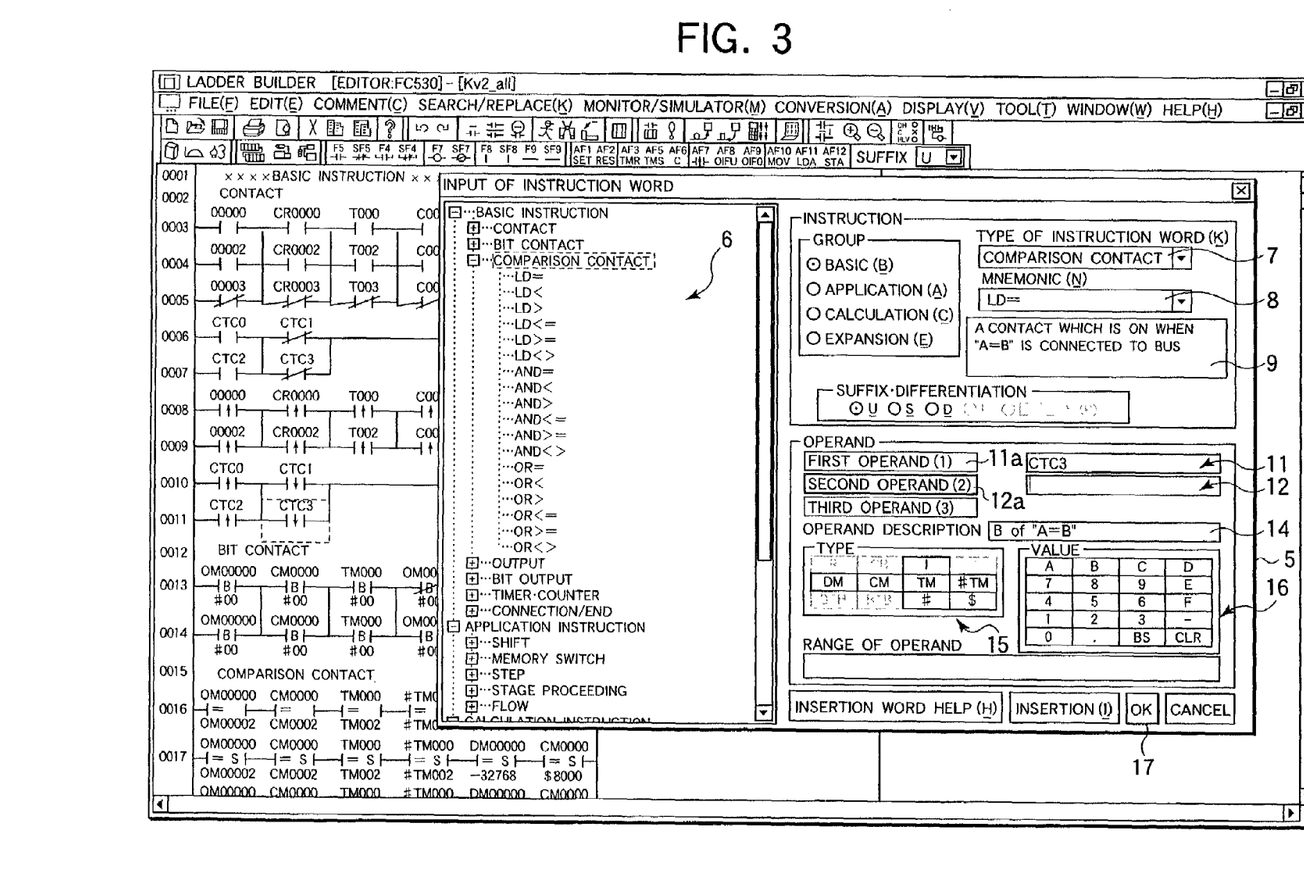
FIG. 3 is a drawing showing a state in which the type of instruction word displayed in an instruction word type display field in the "INPUT OF INSTRUCTION WORD" dialog box is changed.

FIG. 3 shows a display screen containing the "INPUT OF INSTRUCTION WORD" dialog box 5 when "COMPARISON CONTACT" is selected as the instruction word type. As understood from comparison between FIGS. 2 and 3, the mnemonic "LD=" and the operand "CTC3" corresponding to "COMPARISON CONTACT" read from a data file (not shown) are displayed in the mnemonic display field 8 and the first operand input field 11. In addition, the second operand input field 12 is opened blank, prompting the operator to enter in the second operand input field 12. The operator can know the necessity for entering a selection from the fact that the second operand input field 12 requiring entry is blank.

If the operand displayed in the first operand input field 11 needs to be corrected in the screen display state in FIG. 3, the operator clicks on a button 11a belonging to the first operand input field 11, whereby only the buttons allowed as the first operand corresponding to the changed instruction word "COMPARISON CONTACT" can be selected among the buttons 15 for the entry of the operand type and the buttons 16 for the entry of the operand value, all invalidated so far, namely, grayed out. In other words, when the button 11a is clicked, only the buttons allowed as the first operand among the buttons 15 and the buttons 16 are activated (or selectable) and remaining buttons are still kept deactivated (or grayed out). Therefore, the operator can click on any desired buttons from among the selectable buttons, thereby changing the setup value displayed in the first operand input field 11 while preventing an erroneous entry.

If the operand enters the second operand corresponding to the instruction word "COMPARISON CONTACT" in the second operand input field 12, as similar to the entry of the first operand, the operator clicks on a button 12a belonging to the second operand input field 12, whereby only the buttons allowed as the second operand corresponding to the instruction word "COMPARISON CONTACT" can be selected among the buttons 15 and 16. In other words, when the button 12a is clicked, only the buttons as allowed the second operand among the buttons 15 and 16 are activated (or selectable) and remaining buttons are deactivated (or grayed out). Therefore, the operator can click on any desired buttons from among the selectable buttons, thereby setting the second operand while preventing an erroneous entry.

Upon completion of inputting the operand according to the work, the operator clicks on an "OK" button 17 in the "INPUT OF INSTRUCTION WORD" dialog box 5, whereby the setting is complete and the dialog box 5 is closed. The work is repeated, whereby creation of the PLC system program is complete.

The "Unit Editor" described below is plugged in the program creation tool. To start the "Unit Editor", the operator selects a unit editor command (not shown) out of tools 20 (FIG. 1) existing on the menu bar 3 of the Ladder Builder. Then, the "Unit Editor" for aiding in constructing a PLC system is started and the screen is switched to a screen shown in FIG. 4. The "Unit Editor" is a useful tool for simulating a combination of various units making up a PLC system on the screen and for examining combination conditions of the units, etc., before the units are actually combined to construct the PLC system.

The "Unit Editor" will be outlined with reference to FIGS. 11 to 14 before it will be discussed in detail. The "Unit Editor" has several features. The representative features of the "Unit Editor" are as follows:

First feature: The "Unit Editor" comprises a unit selection, placement, and input detection function (section 100 in FIG. 11) and a specific unit selection detection function (section 101 in FIG. 11). When the worker or the operator selects any desired unit and pastes it to a paste board (described later) of the screen, the unit selection, placement, and input detection section 100 detects the type and the on-screen paste position of the selected unit. The selected units are pasted to the paste board so that they are positioned on one horizontal row and are adjacent to each other in the same manner as the units are actually joined. On the screen of the "Unit Editor", the PLC system can also be divided midway for displaying an array of the units with a plurality of rows extending in a lateral direction, the rows being spaced from each other up and down in the same manner as the units are actually placed at a plurality of stages.

Figure 11:
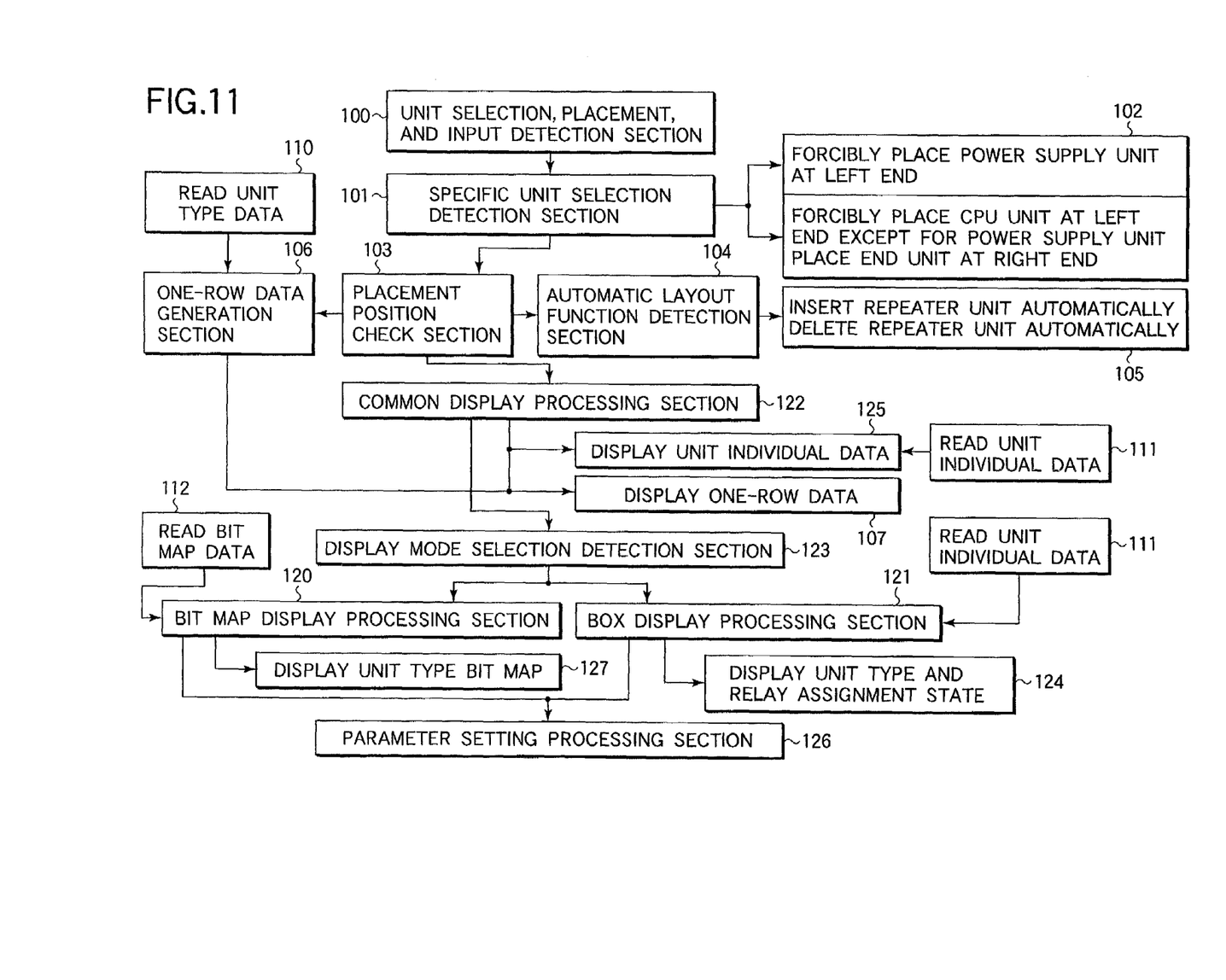
FIG. 11 is a functional block diagram describing the feature functions of the unit editor.

The specific unit selection detection section 101 determines whether or not the unit detected by the unit selection, placement, and input detection section 100, is a specific unit. If the specific unit selection detection section 101 determines that the unit is a specific unit, it forcibly pastes or moves the unit to a predetermined position on the screen as follows:

The specific units are units whose placement positions are uniquely determined in a PLC system; for example, in the PLC system of this embodiment, the specific units include a power supply unit, a CPU unit, an end unit, and a repeater unit. The PLC system of this embodiment is an add-on type system of the type wherein the units, namely, modules, are directly joined to each other and a voltage is supplied to each unit. On the screen of the "Unit Editor", a plurality of rows of the units extending in a lateral direction are spaced from each other up and down, and the placement position of the unit at the left end of each row is defined as a predetermined position on the screen.

When the operator selects a power supply unit as the power supply of the PLC system, the power supply unit is forcibly placed at the left end of the PLC system, namely, at the top thereof. Next, when the operator selects the CPU unit and displays it on the screen, the CPU unit is forcibly placed to the right of the power supply unit already placed on the screen. However, when any other unit than the power supply unit or the CPU unit is displayed on the screen, the end unit may be displayed automatically. That is, the end unit, which is placed at the termination of the PLC system, may be placed automatically. For example, if the worker or the operator does not select the end unit, when he or she selects the CPU unit or any other unit and displays the selected unit on the screen, the end unit may be displayed automatically to the right of the selected unit on the screen (see numeral 102 in FIG. 11).

If the number of units of the PLC system is many, the units can be displayed at a plurality of stages, namely, on a plurality of rows as the actual system is constructed, as described above. When the whole system, comprising a plurality of rows of the units is laid out, a repeater unit is automatically pasted to the termination of the upper row and the top of the lower row. The repeater unit is pasted to each predetermined position based on the fact that the worker or the operator selects the repeater unit. Of course, when the fact that some unit is pasted to the lower row is detected (numeral 103 in FIG. 11), an automatic layout function is operated (numeral 104 in FIG. 11) and a repeater unit is automatically pasted to the termination of the upper row and the top of the lower row (numeral 105 in FIG. 11).

Use of the automatic layout function can be selected on the screen by the operator. When each unit placed on the lower row is deleted or is moved to the upper row, namely, it is recognized that only the repeater unit exists on the lower row, the repeater unit already pasted to the screen is deleted automatically by the automatic layout function. The automatic deletion of the repeater unit works if the units are placed on a plurality of up and down rows.

Second feature: The "Unit Editor" has a function of displaying on each row the total numeric values of the specifications required for examining the units placed on the screen, for example, the total width, weight, and current consumption (and/or voltage consumption) of the units whenever a unit is selected, and displaying the total values on the screen (numerals 106 and 107 in FIG. 11). The voltage consumption value may be calculated, for example, using the internal resistance value existing between the input and output of each unit and the current consumption of each unit, and the calculated value may be set in a unit type data file described later.

Figure 13:
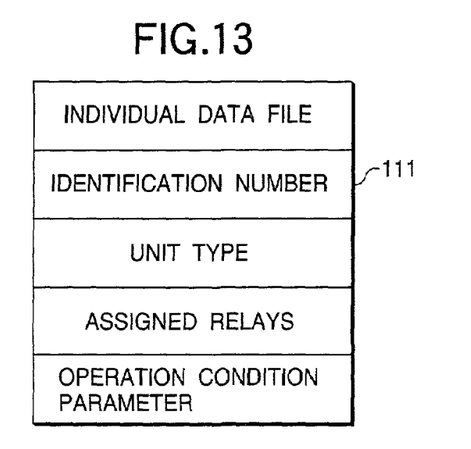
FIG. 13 is a drawing illustrating data stored in an individual data file.
Figure 14:
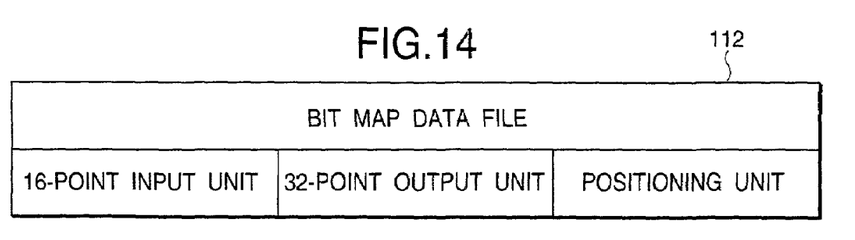
FIG. 14 is a drawing illustrating types of data stored in a bit map data file.

At least the following three data files are stored in memory of the computer (not shown) in which the program development support tool including the "Unit Editor" is installed: The first data file is shown in FIG. 12, the second data file is shown in FIG. 13, and the third data file is shown in FIG. 14.

Figure 12:
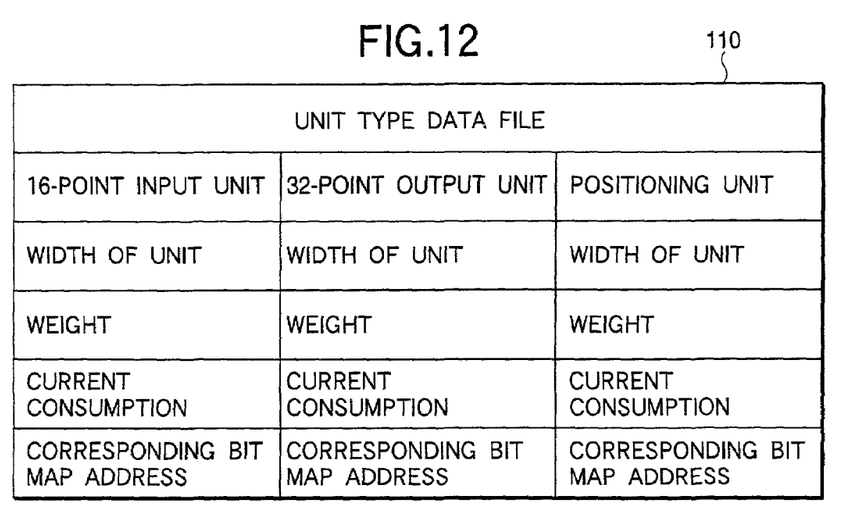
FIG. 12 is a drawing illustrating data stored in a unit type data file.

As seen in FIG. 12, the first data file, namely, unit type data file 110 contains the width dimension, weight, current consumption value, and address for bit map display (pattern display) described later, for each unit type. The second data file, namely, individual data file 111 contains information for each unit. An identification number shown in FIG. 13 indicates the placement order of the corresponding unit counted from the CPU unit. The third data file shown in FIG. 14, namely, the bit map data file, contains patterns for bit map display described later, for each unit type.

Referring again to the flowchart shown in FIG. 11, the one-row data generation section 106 for displaying the numeric values of the width, weight, and current consumption (voltage consumption) described above for each row on the screen reads the data of the units contained in one horizontal row from the unit type data file 110 (FIG. 12) and totals the data.

Third feature: The "Unit Editor" enables the operator to selectively switch the display screen of the whole layout of the units (numeral 122, 123 in FIG. 11) between bit map display (numeral 120 in FIG. 11) for displaying a pattern (schematic front view) with the width of each placed (selected) unit which is scaled down at a predetermined ratio and box pattern display (numeral 121 in FIG. 11) for displaying the units as boxes of the same size. In the box pattern display mode, for each placed (selected) unit, the data read from the individual data file 111 of the corresponding unit is displayed in text or numeric form in the box described later (numeral 124 in FIG. 11). The "Unit Editor" will be discussed in detail specifically based on representative screens shown in FIGS. 4 to 9 including the three described features.

Figure 4:
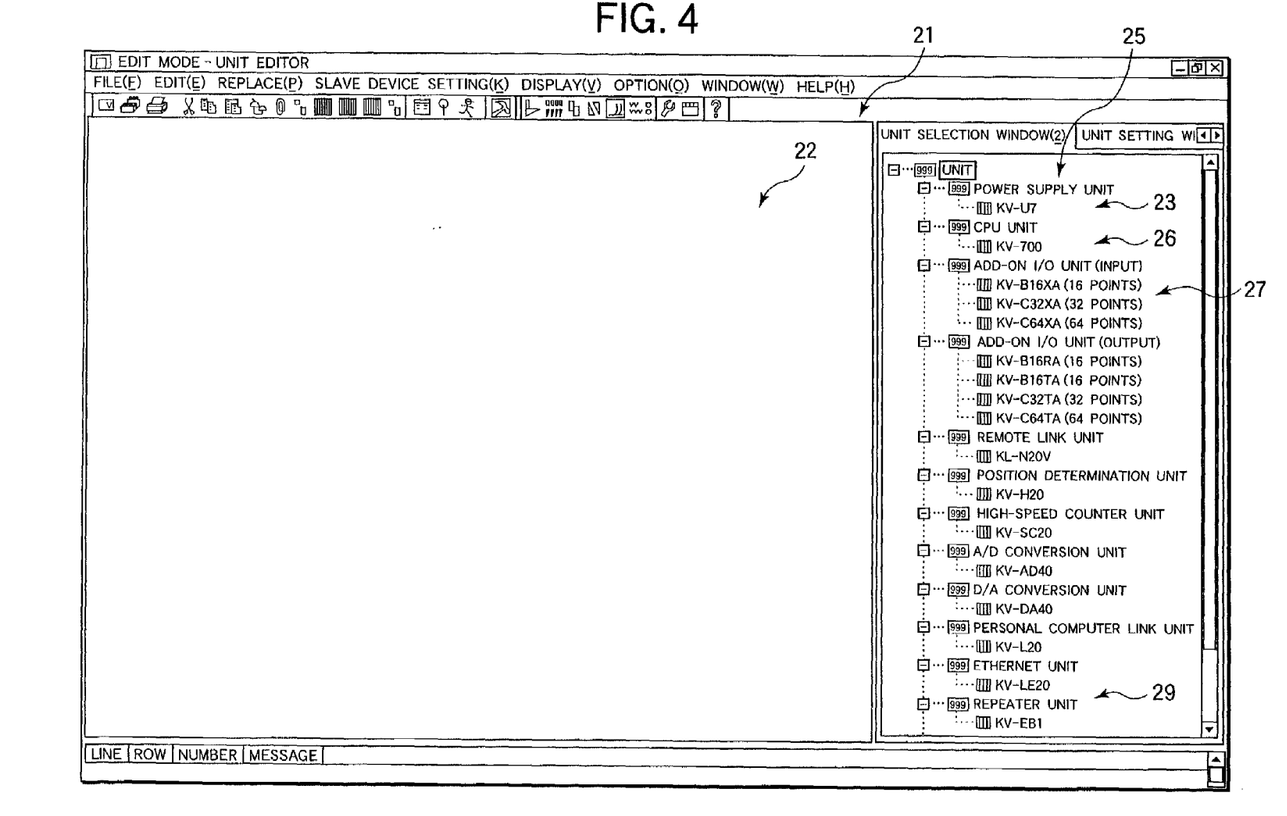
FIG. 4 is a drawing showing a part of a screen when a unit editor of a tool for aiding in constructing the whole layout of a PLC system is started.

A screen 21 of the "Unit Editor" shown in FIG. 4 contains a paste board 22 placed in the left area of the screen and a unit selection window 23 placed in the right area of the screen. The unit selection window 23 lists various units or modules, such as a power supply unit 25, a CPU unit 26, and add-on I/O units (16-point, 32-point, and 64-point input and output units) 27 for constructing the PLC system, in a text display mode or a pattern display mode. The listing of the various units or modules is a list of available specific products. The specifications of the width dimension when each listed product is viewed from the front, the weight of the product, the power consumption of the product, etc., are stored in the unit type data file (FIG. 12) and the unit front pattern with the width dimension of each product scaled down on a proper scale is stored in the bit map file (FIG. 14).

The user selects the units to be used in combination out of the unit selection window 23 by double-clicking any desired units. Then, the patterns of the selected units are pasted in order in the right direction from a predetermined position of the paste board 22. They can also be pasted in a drag-and-drop manner.

Therefore, for example, when the user first selects the add-on I/O unit 27 and next the power supply unit 25, first the add-on I/O unit 27 is temporarily positioned at the top and next when the user first selects the power supply unit 25, the sequence of the power supply unit 25 and the add-on I/O unit 27 is altered automatically, namely, the power supply unit 25 is pasted at the top and the add-on I/O unit 27 is moved to the right of the power supply unit 25 (numeral 102 in FIG. 11). This also applies to the CPU unit 26; when the CPU unit 26 is selected, it is forcibly inserted into the right of the power supply unit 25 at the top. At the same time, an end unit 28 is forcibly inserted into the right end.

Thus, the units whose placement positions are fixed in the system, namely, the units whose placement positions cannot be selected, are pasted to the predetermined positions regardless of the selection sequence of the units. Therefore, the user cannot, through misunderstanding, place a unit whose placement position is fixed at a position in the system where the unit is not allowed.

Figure 5:
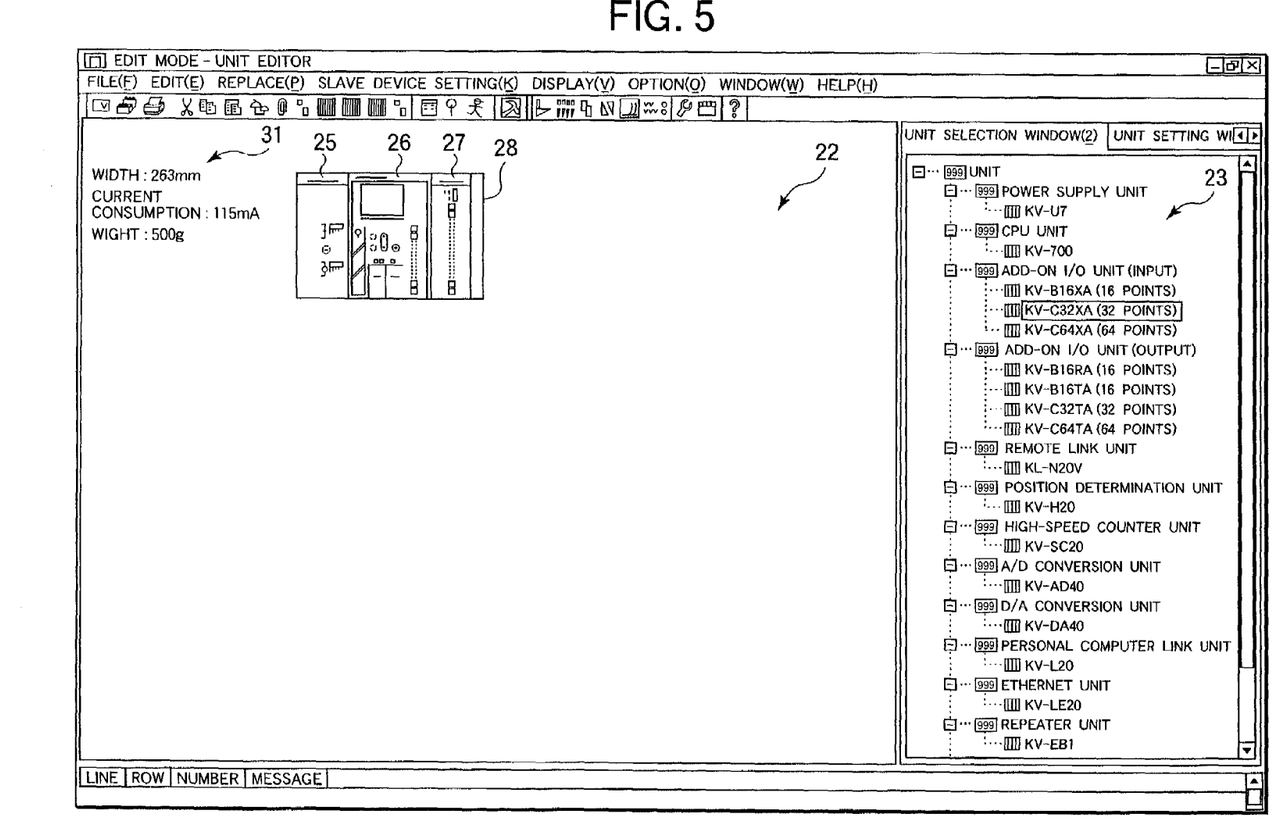
FIG. 5 is a drawing showing a part of a screen when the unit editor is displayed in bit map display mode.

When the CPU unit is first pasted to the paste board 22 according to the first selection action of the user, the end unit 28 is automatically installed to the right of the CPU unit (FIG. 5). Next, when an additional unit is pasted to the paste board 22 according to the second selection action of the user, the end unit 28 is automatically moved to the right of the additional unit (numeral 102 in FIG. 11). That is, whenever the user adds a unit, the end unit 28 is automatically moved to the termination position of the system. Accordingly, the mistake of forgetting about building the end unit in the system can be avoided. Of course, the end unit 28 is contained in the listing of the unit selection window 23 and the user can select the end unit 28 out of the unit selection window 23 for pasting the end unit 28 to the paste board 22.

Figure 6:
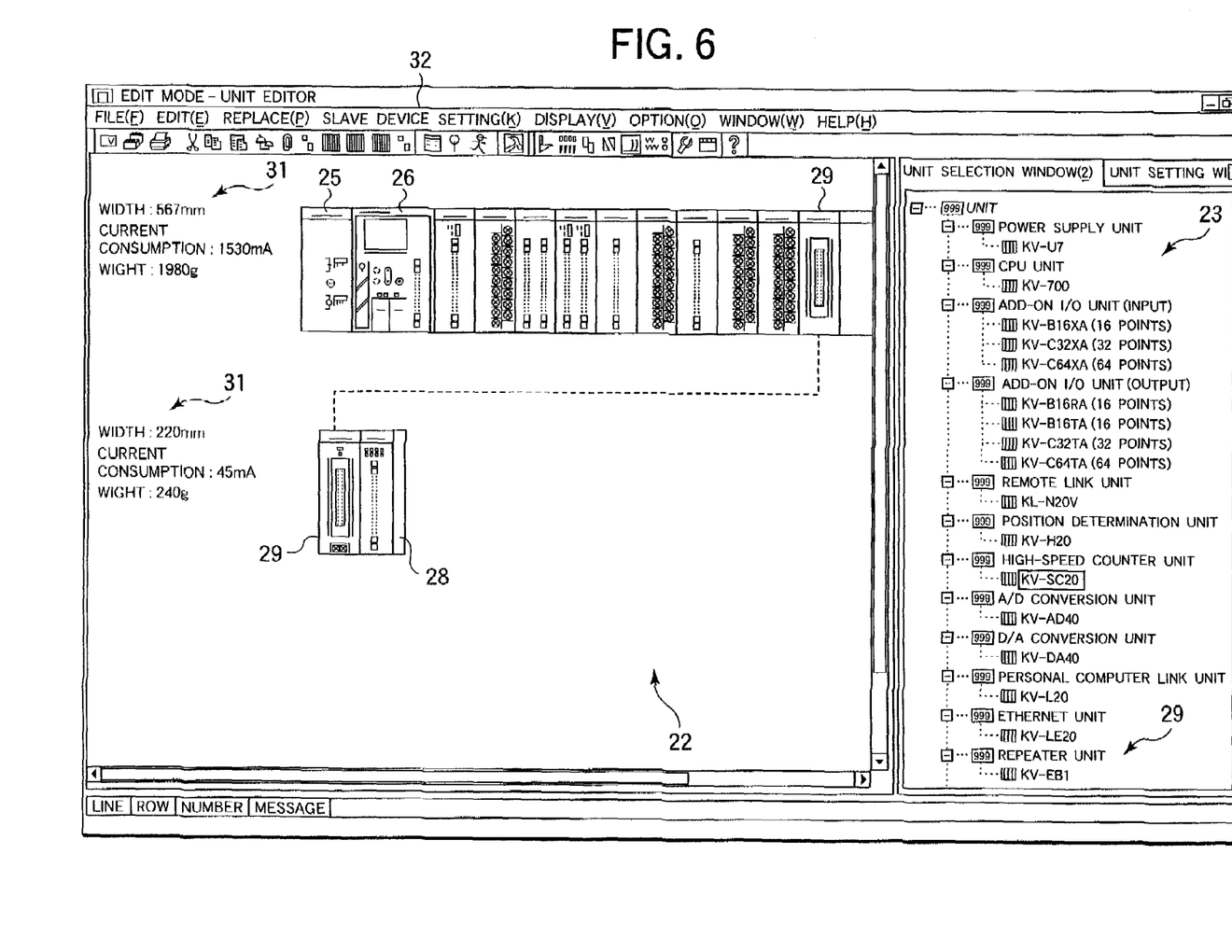
FIG. 6 is a drawing to show a state in which repeater units are automatically inserted by an automatic layout function of the unit editor.

A repeater unit 29 is contained in the listing of the unit selection window 23 (FIG. 4). A pair of the repeater units 29 is a pair of a transmission unit and a reception unit that can be connected by a bus line. The repeater units 29 are used when the system is separated into a plurality of rows and is housed in a control panel. When a unit is placed on the second row, as seen in FIG. 6, the pattern of the repeater unit 29 is automatically pasted to each of the termination (right end) of the first row of the paste board 22 and the top (beginning) of the second row below the first row, and the repeater units 29 on the first and second rows are coupled by an alternate long and short dash line, for example. The alternate long and short dash line means the bus line. When the repeater units 29 are selected, the end unit 28 pasted to the termination of the first row so far is automatically moved to the second row and is placed to the right of the repeater unit 29 on the second row (numeral 105 in FIG. 11).

When the user selects the repeater units 29 and then further selects a unit out of the listing of the unit selection window 23, the selected unit is pasted to the right of the repeater unit 29 on the paste board 22. Whenever the user repeats the selection action, each selected unit is pasted to the right of the second row on the paste board 22 and the units on the second row extend to the right. At each time, the end unit 28 is automatically moved to the right end of the second row.

The power supply unit 25 contained in the listing of the unit selection window 23 can be pasted to the top of the second row as it is selected. However, if the user attempts to select the CPU unit 25 contained in the listing of the unit selection window 23 so as to place the CPU unit 25 on the second row, the selection is canceled, because more than one CPU unit need not be placed in the PLC system.

The reason why placing another power supply unit 25 at the top of the second row is allowed is that when power supply to the second row is made to rely upon the bus line connecting the first and second rows, the power consumed by the second row of the units may be insufficient, namely, the power supply unit 25 on the first row may be unable to supply sufficient power to the units on the second row. In such a case, as an additional power supply, the power supply unit 25 can be installed for the second row aside from the first row.

As shown in FIG. 5, display 31 of text and numeric values is produced at the left of the paste board 22 (numeral 106 in FIG. 11). The display 31 is provided for each row of the system and whenever a unit is added or deleted, the numeric values are updated. The display 31 contains a character string of "WIDTH" and the numeric value of the width (mm units), a character string of "CURRENT CONSUMPTION" and the numeric value of the current consumption (mA units) below the character string "WIDTH" and the numeric value, and a character string of "WEIGHT" and the numeric value of the weight (g units) below the character string "CURRENT CONSUMPTION" and the numeric value. The character string of "WIDTH" means the total length of the units on the corresponding row. The character string of "CURRENT CONSUMPTION" means the total current consumption of the units on the corresponding row. The character string of "WEIGHT" means the total weight of the units on the corresponding row. The displayed numeric values are updated each time a unit is added to the corresponding row. For example, if a new unit is selected and added to the units on the first row, the specifications of the selected unit are read from the data file 110 in FIG. 12 and the displayed numeric values are updated to the total values to which the read values are added.

Thus, seeing the displayed numeric values, the user can compare the numeric values with allowable values of the space of the control panel to install the PLC system and can instantaneously know whether or not the layout of the system on the screen can be allowed. The current consumption is contained as one item of the numeric value display. Thus, seeing the numeric value, the user can instantaneously know whether or not the value lies within the range of the capability of the power supply unit 25 installed on the first row. Therefore, if the user visually checks that sufficient power cannot be supplied from the power supply unit 25 installed on the first row to the units on the second row, immediately the user can know the necessity for installing an added power supply unit 25 to the second row, without again calculating the current consumption.

Figure 7:
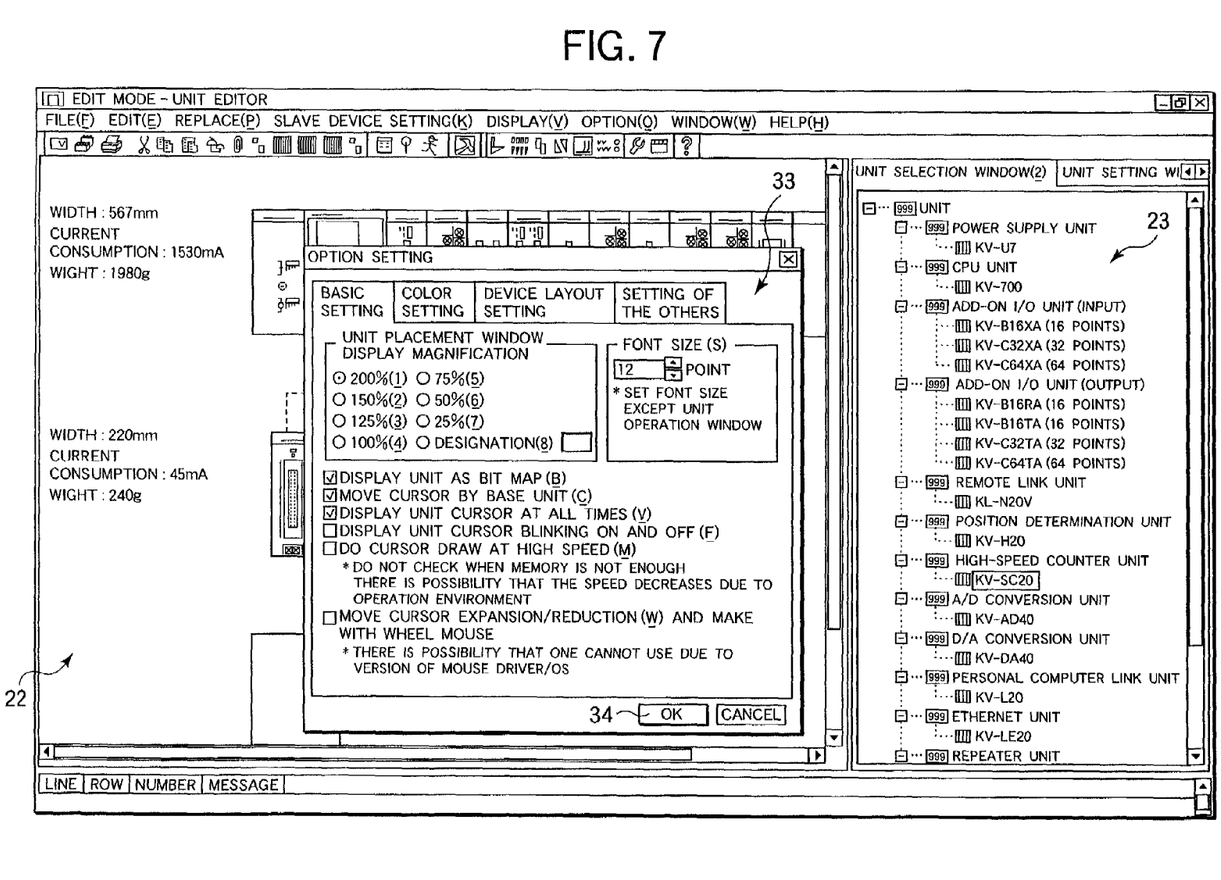
FIG. 7 is a drawing showing a part of a screen in a state in which a dialog box for canceling bit map display and switching to box pattern display is superposed.
Figure 8:
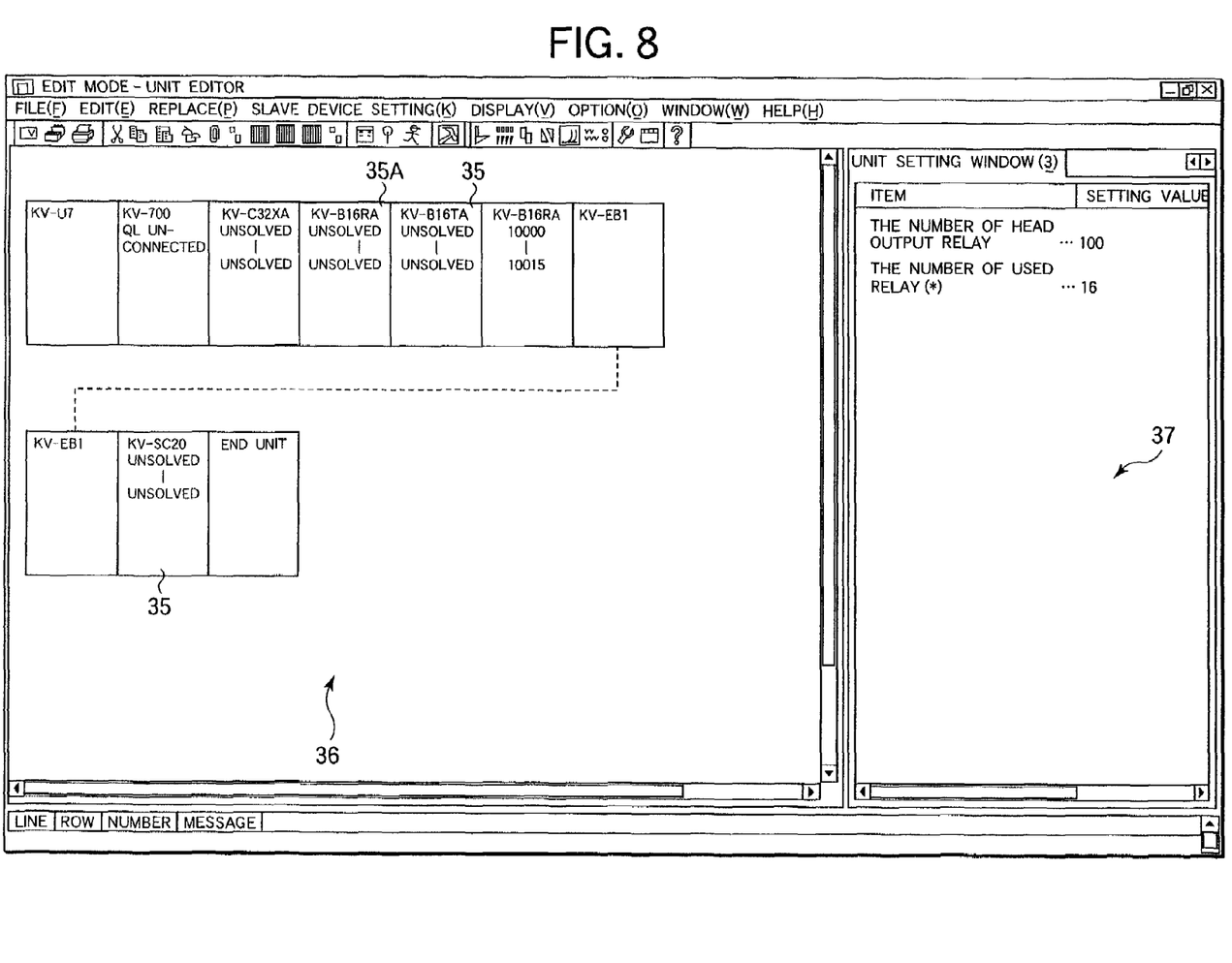
FIG. 8 is a drawing showing a part of a screen in box pattern display mode.

If the user selects option setting out of options 32 existing on the menu bar 3 of the screen, a dialog box "OPTION SETTING" 33 is superposed on the screen display, as shown in FIG. 7. The "OPTION SETTING" dialog box 33 contains an item of bit map display of unit. If the user clicks on the item of bit map display of unit for canceling selection of the item and then clicks on an "OK" button 34, the screen is switched from the paste board 22 in the scale pattern display mode of scaling down the actual units to a screen 36 in the box pattern display mode for displaying the units as simple box patterns 35, as shown in FIG. 8 (numerals 121 and 123 in FIG. 11). The box patterns 35 of the units appearing on the screen 36 in the box pattern display mode are all of the same size and the information for each unit is displayed in the corresponding box pattern 35 in a text format containing character strings and symbols (numerals 121 and 124 in FIG. 11).

That is, in the embodiment, the model of the unit and the setup values of the relay assignment number, for example, are displayed in each box pattern 35. In the example shown in the figure, relay assignment of all units is unset and thus a character string of "UNSOLVED" is displayed. Seeing the displayed character string, the user can know whether or not relay assignment (relay number setting) of each unit is complete.

The unit selection window 23 at the right of the screen is switched to a unit setting window 37 (FIG. 8) as the user clicks on a tab. FIG. 8 also shows the contents displayed on the unit setting window 37 when the user clicks on a box pattern 35a of the fourth unit KV-B16RA (product number) from the left of the first row. As seen in FIG. 8, various setup values of the number of used relays, the relay assignment numbers, input and output line constants, and other information, for example, corresponding to the selected unit are displayed in the unit setting window 37 (numeral 125 in FIG. 11).

Figure 9:
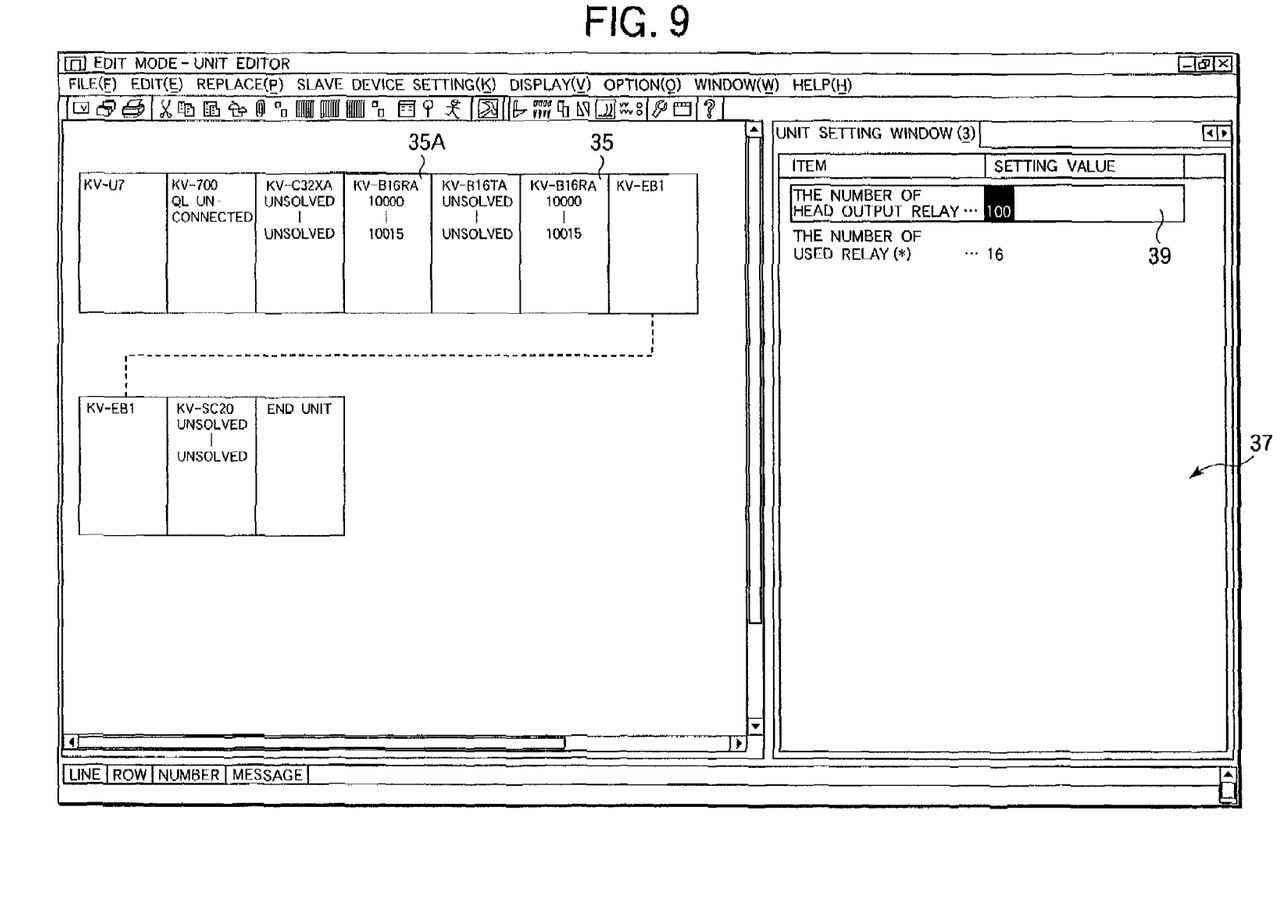
FIG. 9 is a drawing showing a state in which a setup value input field is opened for changing various setup values of units displayed as box patterns.
Figure 10:
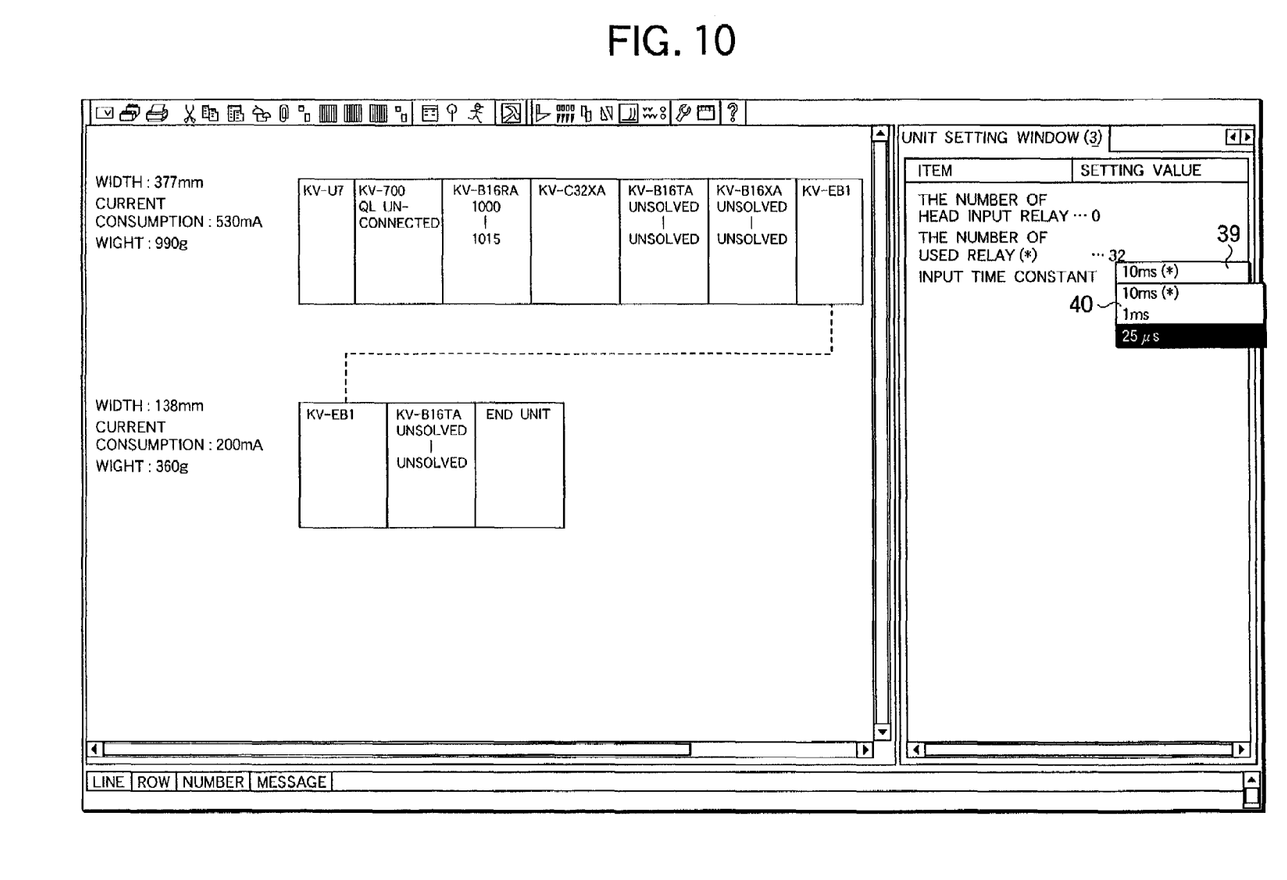
FIG. 10 is a drawing showing a state in which a setup value input field is opened for changing time constants of units displayed as box patterns, and the time constants that can be set in the input field are listed.

If any setup value displayed in the unit setting window 37 needs to be changed, the user double-clicks on the setup value. Then, as shown in FIG. 9, an input field 39 is opened blank when no setup values are entered; when a setup value is already entered, it is displayed in a state in which the setup value can be edited. Accordingly, a setup value can be entered in the input field 39 or the setup value in the input field 39 can be changed. When the user wants to change any time constant displayed in the input field 39, he or she clicks on the input field 39, for example. Then, as shown in FIG. 10, a listing 40 of setup values that can be entered is produced and the user selects any desired setup value out of the listing 40, whereby the selected setup value can be displayed in the input field 39. The setup value thus entered in the input field 39, for example, the relay assignment number or the time constant, is immediately reflected on the display in the corresponding box pattern 35a (numeral 126 in FIG. 11) and is also stored in the individual data file 111.

Preferably, such entering or changing the setup value using the unit setting window 37 can also be executed in a similar manner in the above-described scale pattern display (bit map display) mode. That is, the unit selection window 23 at the right of the screen may be switched to the unit setting window 37 as the user clicks on the tab of the unit selection window 23 with any desired unit selected from among the units placed on the paste board 22 in the scale pattern display (bit map display) mode.

The size of each box pattern 35 displayed in the scale pattern display mode may be set to such an extent that the characters displayed in the box pattern 35 are not hard to see. Accordingly, the worker can see the display contents in the box pattern 35 and know an outline of how the terminals of each unit are set. The worker can also immediately check the details by seeing the unit setting window 37 at the right of the screen. If a new setup value needs to be set or an already entered setup value needs to be corrected, the worker can easily set or correct the setup value by simply calling the unit setting window 37 and entering any desired setup value or changing any existing setup value.

What is claimed is:

1. A Programmable Logic Controller ("PLC") system construction support tool for simulating a selection of units and a combination thereof on a screen before a PLC system is actually constructed, said PLC system construction support tool comprising:

a first screen for displaying a list of various units which can be selected for constructing the PLC system, wherein the list of various units comprises units making up the PLC system; and a second screen for displaying the units selected from the first screen in a configuration as the units would actually be disposed in the PLC system, said second screen being disposed adjacent to the first screen, wherein the second screen displays information in numerical form in an area adjacent to a row of the units on the second screen, the information comprising total values of at least one of current consumption, voltage consumption, width, and weight of each of the units displayed on the second screen; and a unit type data file storing at least one of the current consumption, the voltage consumption, the width, and the weight of each of the units displayed on the first screen, wherein whenever a unit is selected from the first screen, at least one of the current consumption, the voltage consumption, the width, and the weight of the selected unit is read from the unit type data file and displayed on the second screen.

2. The PLC system construction support tool as claimed in claim 1, wherein the second screen displays information about the types of the units displayed on the second screen.

3. The PLC system construction support tool as claimed in claim 2, wherein the second screen displays the units selected from the first screen on a plurality of rows, and displays the information in numerical form in an area adjacent to each corresponding row of the units, the information comprising total values of at least one of current consumption, voltage consumption, width dimension, and weight of each of the units on the corresponding row displayed on the second screen.

4. The PLC system construction support tool as claimed in claim 1, further comprising:

a display mode switch unit for switching the second screen between a first display mode for displaying schematic front patterns of the units, and a second display mode for displaying the units as box patterns and for displaying assigned relay numbers of the units in association with the box pattern of the selected unit.

5. The PLC system construction support tool as claimed in claim 4, further comprising:

a first data file storing information for displaying the units displayed on the first screen on the second screen in the first display mode; and a second data file storing the assigned relay numbers of the units displayed on the first screen, wherein in the first display mode, the information concerning the unit selected out of the first screen is read from the first data file and the selected unit is displayed as a schematic front pattern, and wherein in the second display mode, the assigned relay number of the unit selected out of the first screen is read from the second data file and is displayed in a numeric form.

6. The PLC system construction support tool as claimed in claim 4, further comprising:

a third screen for entering the assigned relay number of each of the units displayed on the second screen.

7. The PLC system construction support tool as claimed in claim 6, further comprising:

a screen switch unit for switching the displayed screen between the third screen and the first screen.

8. The PLC system construction support tool as claimed in claim 4, wherein in at least one of the first display mode and the second display mode, the second screen displays total values of at least one of current consumption, voltage consumption, width, and weight of the units displayed on the second screen in numerical form in an area adjacent to a row of the units on the second screen.

9. The PLC system construction support tool as claimed in claim 1, further comprising:
a determination unit for determining whether or not a specific unit is selected from among the various units displayed on the first screen; and
a first placement unit for placing the specific unit at a predetermined position on the second screen when the specific unit is selected.

10. The PLC system construction support tool as claimed in claim 9, wherein the specific unit is a CPU unit.

11. The PLC system construction support tool as claimed in claim 9, wherein the specific unit is a power supply unit.

12. The PLC system construction support tool as claimed in claim 1, further comprising:
a second placement unit for automatically displaying a repeater unit at termination of a first row and at beginning of a second row when the units displayed on the second screen are disposed on the first row and the second row.

13. The PLC system construction support tool as claimed in claim 1, further comprising:
a third placement unit for automatically displaying an end unit at termination of a row of the units displayed on the second screen.

14. A Programmable Logic Controller ("PLC") system program development support tool comprising:
a PLC program creation tool for creating a ladder program and creating a program converted into instruction commands to operate a PLC system in accordance with the created ladder program; and
a PLC system construction support tool built in said PLC program creation tool for simulating a selection of units and a combination thereof on a screen before the PLC system is actually constructed, said PLC system construction support tool comprising:
a first screen for displaying a list of various units that can be selected for constructing the PLC system, wherein the list of various units comprises units making up the PLC system; and
a second screen for displaying the units selected from the first screen in a configuration as the units would actually be disposed in the PLC system, said second screen being disposed adjacent to the first screen, wherein the second screen displays information in numerical form in an area adjacent to a row of the units on the second screen, the information comprising total values of at least one of current consumption, voltage consumption, width, and weight of each of the units displayed on the second screen; and
a unit type data file storing at least one of the current consumption, the voltage consumption, the width, and the weight of each of the units displayed on the first screen,
wherein whenever a unit is selected from the first screen, at least one of the current consumption, the voltage consumption, the width, and the weight of the selected unit is read from the unit type data file and displayed on the second screen.

15. The PLC system program development support tool as claimed in claim 14, wherein the second screen displays information about the types of the units displayed on the second screen.

16. The PLC system program development support tool as claimed in claim 15, wherein the second screen displays the units selected from the first screen on a plurality of rows and displays the information in numerical form in an area adjacent to each corresponding row of the units, the information comprising total values of at least one of current consumption, voltage consumption, width dimension, and weight of each of the units on the corresponding row displayed on the second screen.

17. A Programmable Logic Controller ("PLC") system construction support tool for simulating a selection of units and a combination thereof on a screen before a PLC system is actually constructed, said PLC system construction support tool comprising:
a first screen for displaying a list of various units which can be selected for constructing the PLC system, wherein the list of various units comprises units making up the PLC system and wherein the list comprises at least one graphical icon that is selectable and adapted to be displayed on the second screen;
a second screen for displaying the units selected from the first screen in a configuration as the units would actually be disposed in the PLC system, said second screen being disposed adjacent to the first screen, wherein the second screen displays information in numerical form in an area adjacent to a row of the units on the second screen, the information comprising total values of at least one of current consumption, voltage consumption, width, and weight of each of the units displayed on the second screen; and
a unit type data file storing at least one of the current consumption, the voltage consumption, the width, and the weight of each of the units displayed on the first screen,
wherein whenever a unit is selected from the first screen, at least one of the current consumption, the voltage consumption, the width, and the weight of the selected unit is read from the unit type data file and displayed on the second screen.

* * * * *